United States Patent [19]

Shufran

[11] 4,102,449

[45] Jul. 25, 1978

[54] WALKING BEAM CONVEYING APPARATUS AND METHOD

[75] Inventor: Steve Shufran, North Versailles Township, Allegheny County, Pa.

[73] Assignee: United States Steel Corporation, Pittsburgh, Pa.

[21] Appl. No.: 722,173

[22] Filed: Sep. 10, 1976

[51] Int. Cl.² ............................................. B65G 25/04
[52] U.S. Cl. ................................. 198/774; 214/18 R; 432/122
[58] Field of Search ............... 198/485, 487, 488, 614, 198/774, 462, 775, 776; 214/18 R; 432/122

[56] References Cited

U.S. PATENT DOCUMENTS

| 2,858,122 | 10/1958 | MacGregor | 214/18 R |
| 3,266,615 | 8/1966 | Sephton et al. | 198/774 |
| 3,416,646 | 12/1968 | Boos et al. | 198/774 |

Primary Examiner—Evon C. Blunk
Assistant Examiner—Joseph E. Valenza
Attorney, Agent, or Firm—Walter P. Wood

[57] ABSTRACT

A walking beam conveying apparatus for handling elongated cylindrical articles and a handling method particularly applicable to a reheating furnace for pipes. Articles, such as pipes, are advanced in steps along the conveyor simply by raising and lowering movable beams without moving the beams axially as long as the articles are straight and can roll. The movable beams can move axially to advance bent articles incapable of rolling. The beams can be raised at one end only to introduce articles to the conveyor for storage without advancing articles already carried on the beams.

3 Claims, 8 Drawing Figures

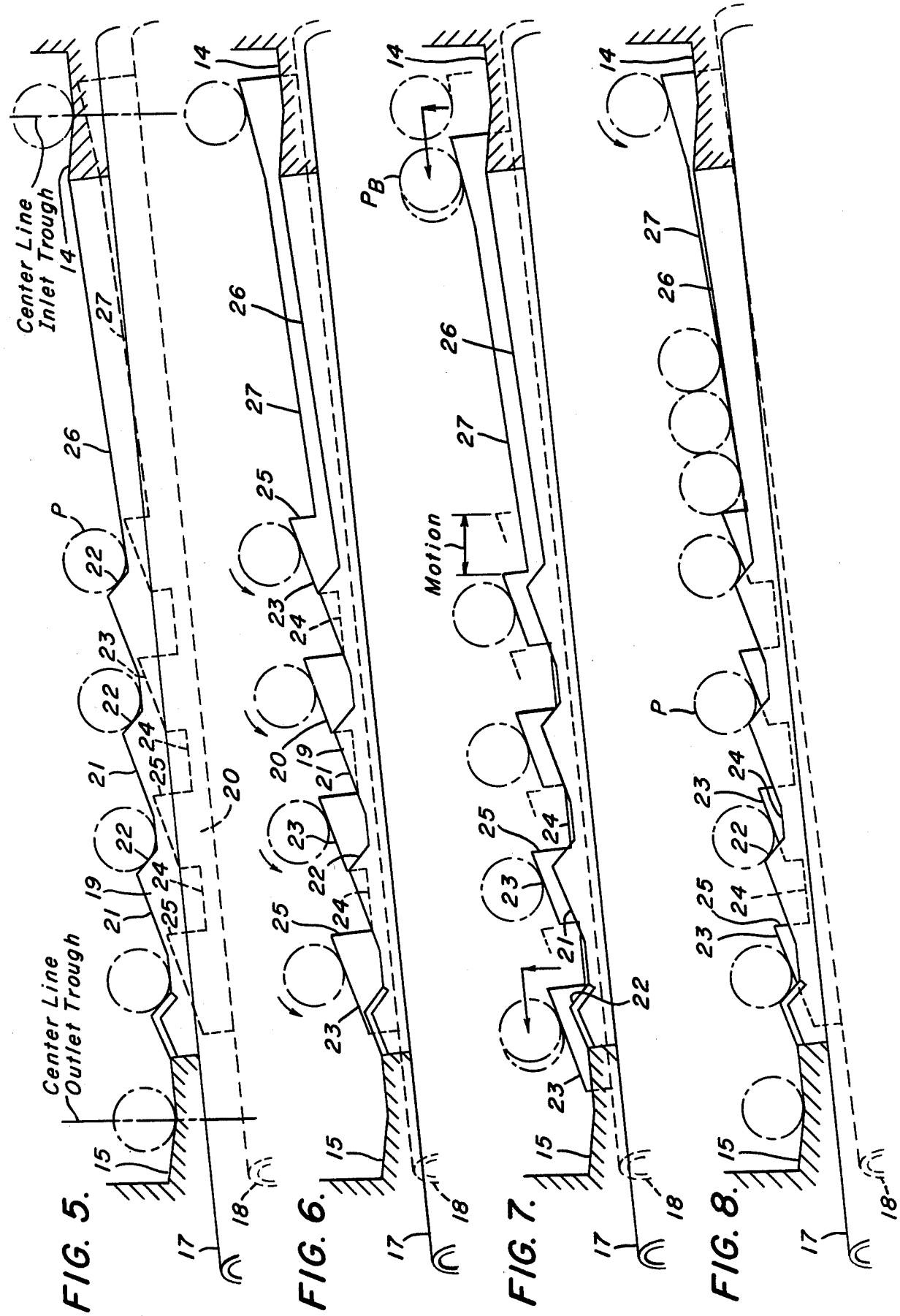

WALKING BEAM CONVEYING APPARATUS AND METHOD

This invention relates to an improved walking beam conveying apparatus for handling elongated cylindrical articles and to an improved method of handling articles carried thereon.

Although my invention is not thus limited, my conveying apparatus and handling method are particularly useful when embodied in a reheating furnace for metal workpieces, such as steel pipes. It is known to use walking beam conveying apparatus for carrying elongated workpieces through a furnace or across a cooling bed, etc. A conventional walking beam conveying apparatus includes a set of parallel stationary beams and a set of parallel movable beams which can be raised and lowered and also moved axially. The beams of both sets have series of notches in their upper faces. Elongated articles are introduced singly to notches in the stationary beams at the entry side or end. The articles are advanced in steps along the stationary beams by (a) raising the movable beams to lift the articles, (b) moving the movable beams axially the length of one notch, (c) lowering the movable beams to drop the articles in the next set of notches of the stationary beams, and (d) returning the movable beams to their starting position. For exemplary showings, reference can be made to Cochran et al U.S. Pat. No. 2,017,024, Hein et al U.S. Pat. No. 3,265,187, Suydam U.S. Pat. No. 3,749,550, or Keough U.S. Pat. No. 3,512,628.

An object of my invention is to provide an improved walking beam conveying apparatus and method in which the movable beams need only be raised and lowered to advance elongated cylindrical articles if the articles are straight and can roll, but in which the movable beams can move axially to advance bent articles incapable of rolling.

A further object is to provide an improved walking beam conveying apparatus in which both ends of the movable beams can be raised and lowered simultaneously for normal operation, or one end only of the movable beams can be raised and lowered to introduce articles to the apparatus for storage without advancing articles already on the apparatus.

A further object is to provide an improved walking beam conveying apparatus which has surge capacity for storing articles without advancing them, for example to store pipes in a reheating furnace in the event of a mill delay.

In the drawings:

FIG. 5 is a diagrammatic side elevational view of one stationary beam and one movable beam embodied in the apparatus with the movable beam in its lowered or starting position;

FIG. 6 is a view similar to FIG. 5, but showing the movable beam in its raised position;

FIG. 7 is another similar view, but showing the movable beam raised and advanced axially; and FIG. 8 is another similar view, but showing the movable beam raised only at its entry end for storing articles.

Figure 1:
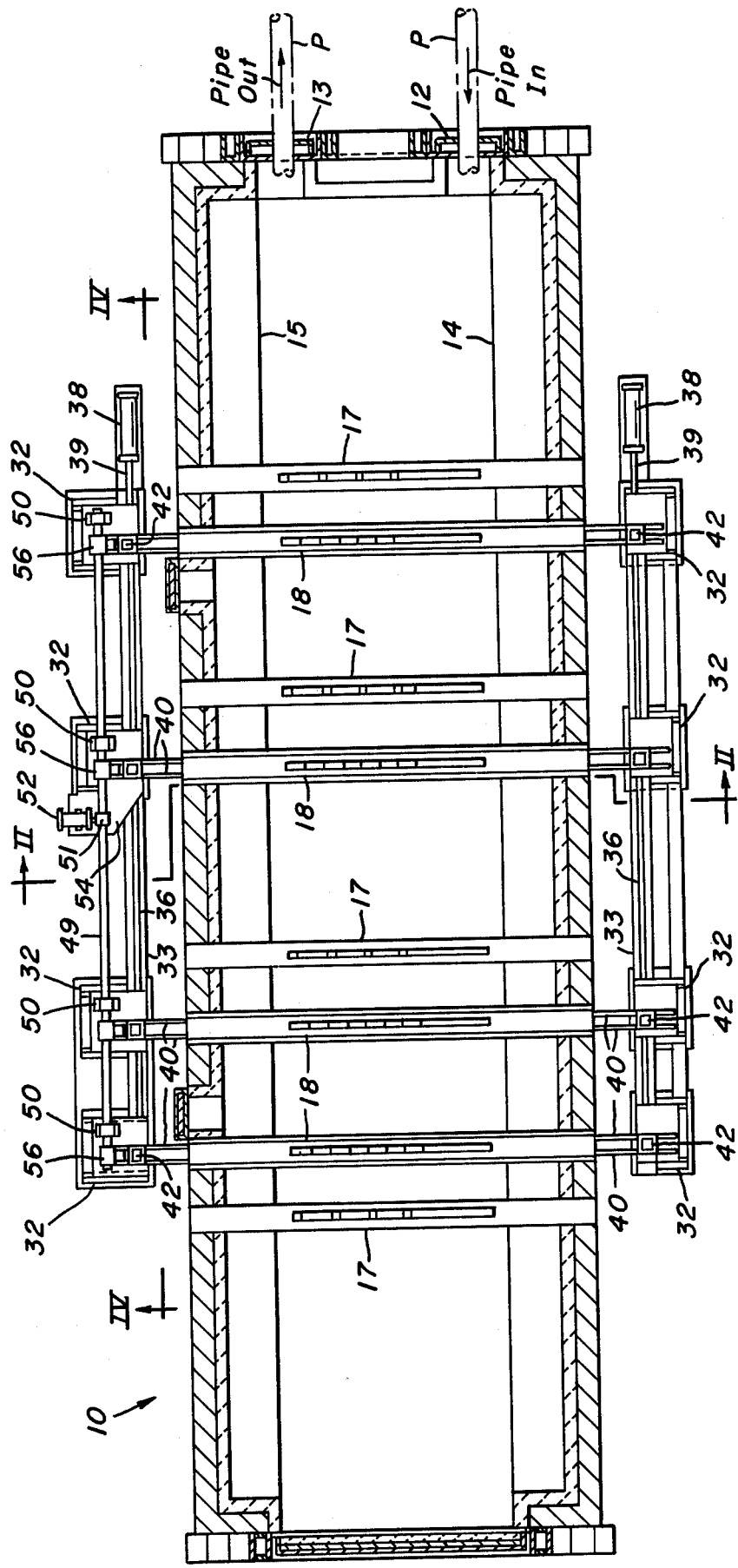
FIG. 1 is a top plan view of a conveying apparatus constructed in accordance with my invention installed in a reheating furnace for steel pipes.
Figure 2:
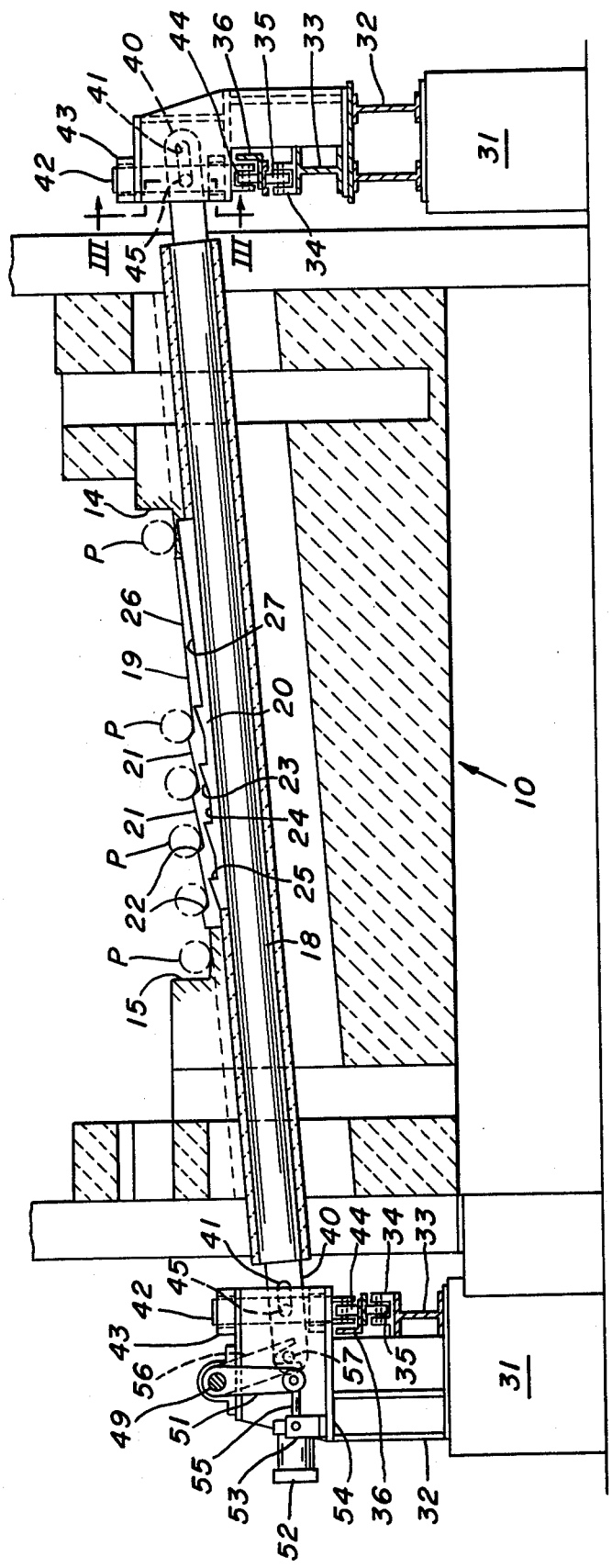
FIG. 2 is a vertical section on line II—II of FIG. 1.

To illustrate one application of my conveying apparatus, FIGS. 1 and 2 show an otherwise conventional reheating furnace 10 for steel pipes P. The front wall of the furnace has entry and exit doors 12 and 13 adjacent opposite sides of the furnace (FIG. 1). The interior of the furnace has entry and exit troughs 14 and 15 aligned with the respective doors (FIG. 2). Pipes P to be reheated are introduced to the entry trough 14 and carried the width of the furnace on my conveying apparatus to the exit trough 15, from which they are withdrawn. The apparatus for introducing and withdrawing pipes are not shown, since they are conventional.

My conveying apparatus includes a plurality of elongated parallel water-cooled stationary beams 17 and a like number of elongated parallel water-cooled movable beams 18. The stationary beams are fixed at their ends to the side walls of furnace 10, while the movable beams protrude through the side walls. As best shown in FIG. 2, beams 17 and 18 extend from beyond the entry trough 14 to beyond the exit trough 15 and slope toward the latter. Respective notched bars 19 and 20 are fixed to the upper faces of the stationary and movable beams 17 and 18. The notches in bars 19 have relatively long surfaces 21 sloping toward the exit trough, and stops 22 at the ends of their sloping surfaces. The notches in bars 20 have shorter sloping surfaces 23, relatively short surfaces 24 extending parallel to the beam axis, and stops 25. Bars 19 and 20 also have elongated sloping segments 26 and 27 respectively which extend from their entry ends to the first sets of stops 22 and 25.

Figure 3:
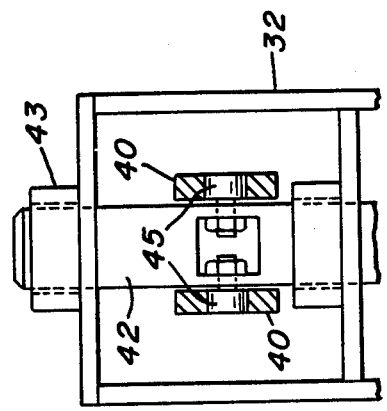
FIG. 3 is a vertical section on a larger scale on line III—III of FIG. 2.
Figure 4:
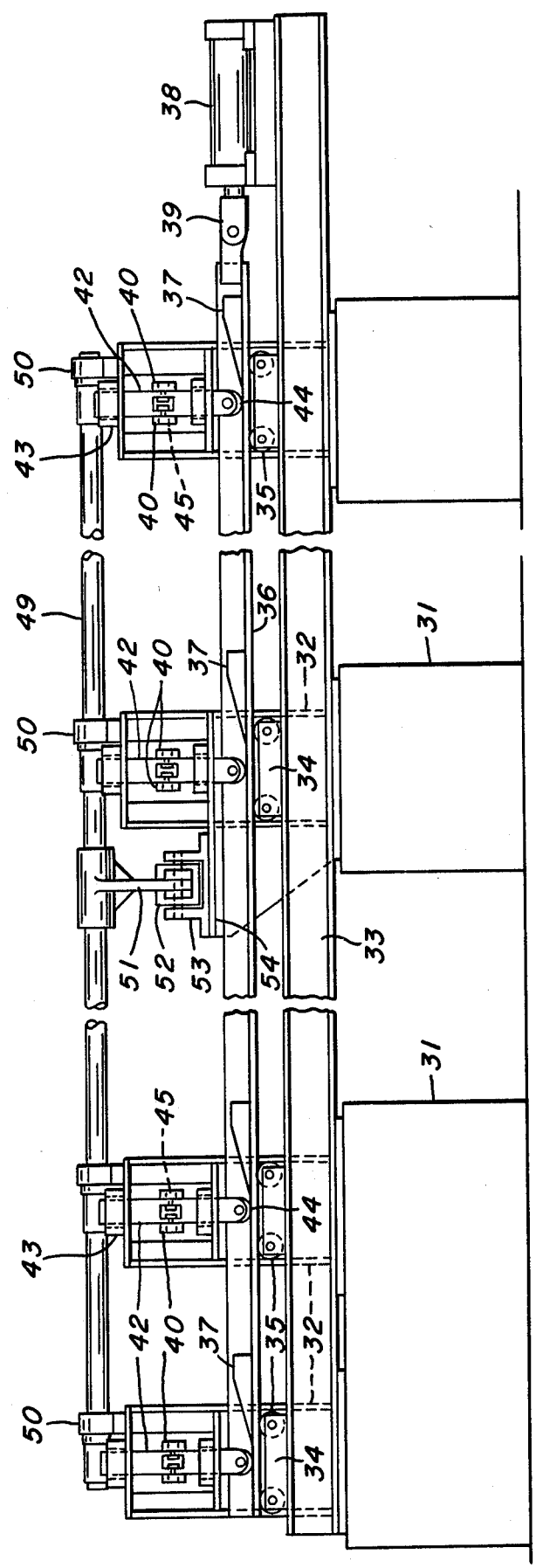
FIG. 4 is a vertical section one line IV—IV of FIG. 1.

The movable beams 18 can be raised and lowered and also moved axially. Independently operable mechanisms for raising and lowering these beams are located outside the opposite side walls of the furnace 10. As shown in FIGS. 2 and 4, the mechanism outside the exit side is supported on a plurality of base members 31 and pedestals 32 mounted on the respective base members. The lower portions of the pedestals carry a fixed beam 33 which extends parallel with the furnace wall. The upper face of this beam carries a plurality of brackets 34 in which are journaled rollers 35. An elongated cam bar 36 is supported on said rollers for axial movement transversely of the beams and has respective upwardly facing cams 37 opposite the protruding ends of the movable beams 18. A double-acting fluid pressure cylinder 38 (or equivalent linear motion device) is mounted on beam 33 and has a reciprocable piston and piston rod 39 connected to the adjacent end of the cam bar. Each movable beam 18 has a respective pair of ears 40 which extend from its protruding end and have slots 41. As best shown in FIG. 3, respective vertically extending bars 42 are mounted in guideways 43 in pedestals 32 for vertical movement. Each bar 42 has a respective roller 44 journaled to its lower end and riding on the cam bar 36 (FIGS. 2 and 4). The bars 42 carry pins 45 which extend from its sides and are received in slots 41 (FIG. 3). The mechanism located outside the entry side of the furnace for raising and lowering the movable beams 18 is similar except that the pedestals are higher.

The mechanism for moving the movable beams 18 axially is located outside the exit side of the furnace. This mechanism includes a shaft 49 journaled in brackets 50 upstanding from the pedestals 32. The central portion of the shaft carries a depending operating lever 51. A double-acting fluid pressure cylinder 52 (or equivalent linear motion device) is pivotally supported on a bracket 53 upstanding from a shelf 54 fixed to one of the pedestals 32. Cylinder 52 has a reciprocable piston and piston rod 55, the end of which is pivotally connected to the lower end of lever 51. Shaft 49 also carries respective levers 56 opposite each pair of ears 40. The ends of levers 56 are bifurcated and receive pins 57 extending between the ears.

OPERATION

As best shown in the diagrammatic views of FIGS. 5 to 8, in the starting position (FIG. 5), the movable beams 18 are lowered and fully to the right in the axial direction. The piston rods 39 at both sides of the furnace 10 are fully retracted, the cams 36 are to the right of their respective rollers 44 as viewed in FIG. 4, and the piston rod 55 is fully extended. A pipe P lies within the entry trough 14. Other pipes P occupy the notches in bars 19 on the stationary beams 17, where they rest against stops 22.

To advance the pipes, I project the piston rods 35 at both sides of the furnace simultaneously, whereupon cams 37 on both cam bars 36 ride under the rollers 44 and raise the movable beams 18 at both ends to the piston shown in FIG. 6. The pipe P in the entry trough 14 is lifted and rolls down the sloping segments 27 of the bars 20 until it abuts the first set of stops 25. The sloping surfaces 23 of bars 20 engage the pipes already within the notches in bars 19 and lift the pipes from the latter bars. When the movable beams are in their raised position, the sloping surfaces 23 lie in the same planes as the respective sloping surfaces 21. Hence as long as the pipes P are straight, they roll down these planes until they abut the next set of stops 25, and it is not necessary to move the movable beams 18 axially. Next I retract both piston rods 39 and thus lower the movable beams to their starting position, whereupon the pipes roll until they abut the next set of stops 22 of bars 19. The pipe which occupied the last set of notches rolls into the exit trough 15 to be withdrawn from the furnace.

If a bent pipe $P_B$ which does not roll is introduced to the entry trough 14, I first lift the pipes to the position shown in FIG. 6, as already described. Next I retract the piston rod 55 and thus pull the movable beams to the left as shown in FIG. 7. Raising the movable beams lifts the bent pipe from the entry trough as before, while moving the beams axially gives the bent pipe a shove, whereupon it slides down the sloping segments 27 of bars 20 until it abuts the first set of stops 25. Next I project the piston rod 55 and retract the piston rods 39 to return the movable beams to their starting position. To advance the bent pipe along bars 19, I repeat the same procedure. Each movement of the bars 20 axially positions the bent pipe over the next set of sloping surfaces 21 of the bars 19. When I subsequently return the movable beams to their starting positions, the bent pipe drops and slides into the next set of notches in bar 19.

On occasion it may be necessary to hold back pipes from the processing equipment which follows the reheating furnace while pipes continue to be delivered to the furnace. When a mill delay of this kind occurs, the sloping segments 26 and 27 of bars 19 and 20 afford surge capacity for storing several pipes P until the processing equipment is ready to receive them. When pipes are to be stored, I project the piston rod 39 at the entry side of the furnace independently to lift the movable beams 18 only at their entry ends, as shown in FIG. 8. This lifts the pipe P from the entry trough 14 onto the sloping segments 26 and 27. I do not project the piston rod 39 at the exit side. Hence the pipes already occupying the notches in bar 19 are not lifted clear of stops 22 and do not advance. Subsequently, when the mill delay has terminated, the pipes move along the conveying apparatus as before.

From the foregoing description it is seen that my invention affords a walking beam conveying apparatus which simplifies the motion necessary to move elongated cylindrical articles along in steps as long as the articles are straight and capable of rolling. If the articles are bent and cannot roll, they may be moved in conventional fashion by also moving the movable beams axially. My conveying apparatus also affords surge capacity. By raising the movable beams at the entry end independently, I am able to introduce articles to the sloping segments of the bars for storage without advancing articles already on the conveying apparatus. It is also apparent that a conveying apparatus constructed in accordance with my invention may be used in applications other than a reheating furnace, for example a cooling bed.

I claim:

1. In a structure in which elongated cylindrical articles are handled, said structure including entry and exit troughs and a walking beam conveying apparatus for carrying articles from said entry trough to said exit trough, said conveying apparatus comprising:
   a plurality of elongated parallel stationary beams extending from said entry trough to said exit trough;
   a plurality of elongated parallel movable beams extending from said entry trough to said exit trough; and
   means on said beams providing article-receiving notches;
   the combination therewith of an improved mechanism for operating said movable beams, said mechanism comprising:
   independently operable means at opposite ends of said beams for raising and lowering said movable beams at both ends simultaneously to advance articles from one set of notches to the next or for raising and lowering said movable beams at their entry ends only to introduce articles from said entry trough to the beams without advancing articles already occupying said notches;
   means on said beams providing sloping surfaces extending from said entry trough to said notches to receive articles for storage; and
   means operatively connected with said movable beams for moving them axially.

2. In a structure in which elongated cylindrical articles are handled, said structure including spaced apart entry and exit troughs and a walking-beam conveying apparatus for carrying elongated cylindrical articles from said entry trough to said exit trough, said conveying apparatus comprising:
   a plurality of elongated parallel stationary and movable beams extending from said entry trough to said exit trough and having entry and exit ends adjacent the respective troughs;
   means on said stationary and movable beams providing article-receiving notches; and
   drive means operatively connected with said movable beams at both the entry and exit ends for raising and lowering the movable beams and at one end for moving them axially to advance articles along the stationary beams to said exit trough;

the improvement in which:

said stationary and movable beams have sloping storage segments extending from said entry trough, and stops at the ends of said segments preceding the first of said notches, said segments being of a length to store a plurality of articles; and the drive means at the entry ends of said movable beams are operable independently of the drive means at the exit ends to raise and lower said movable beams from their entry ends only and thus transfer articles from said entry trough to said storage segments while articles already on said storage segments and within said notches remain in place.

3. A combination as defined in claim 2 in which said structure is a reheating furnace for pipes.

* * * * *